May 26, 1959  A. CHARLAT  2,887,695
ROTARY TOOL SPINDLE REVERSING MEANS
Filed Oct. 22, 1958  5 Sheets-Sheet 1

FIG. I

INVENTOR
Arnold Charlat
BY
Pennie Edmonds Morton Barrows Taylor
ATTORNEYS

May 26, 1959 A. CHARLAT 2,887,695
ROTARY TOOL SPINDLE REVERSING MEANS
Filed Oct. 22, 1958 5 Sheets-Sheet 3

INVENTOR
Arnold Charlat
BY
ATTORNEYS

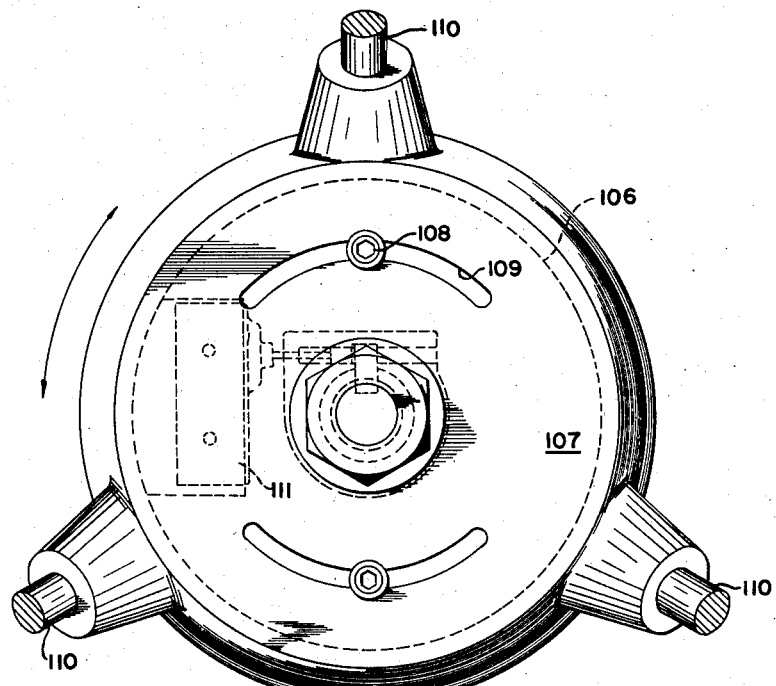
FIG. 8
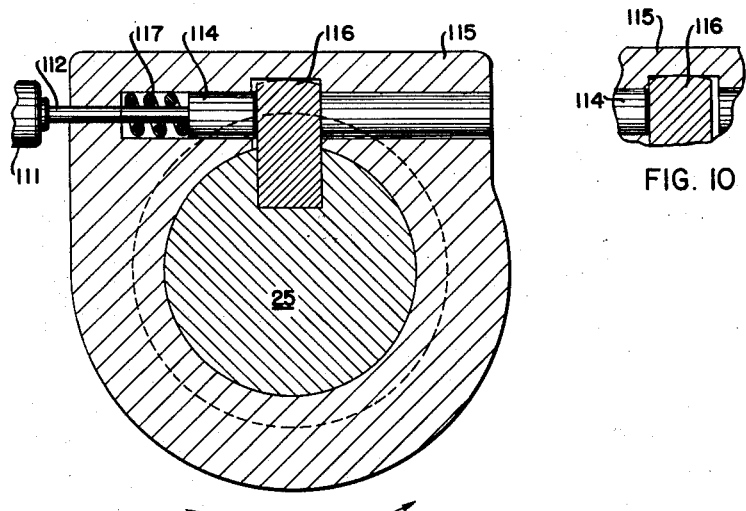
FIG. 9
FIG. 10

May 26, 1959  A. CHARLAT  2,887,695
ROTARY TOOL SPINDLE REVERSING MEANS
Filed Oct. 22, 1958  5 Sheets-Sheet 5

INVENTOR
Arnold Charlat
BY
ATTORNEYS

United States Patent Office 2,887,695
Patented May 26, 1959

2,887,695

ROTARY TOOL SPINDLE REVERSING MEANS

Arnold Charlat, Norwalk, Conn., assignor to Brown & Sharpe Turret Drilling Division, Inc., a corporation of Delaware Original application March 18, 1954, Serial No. 417,103. Divided and this application October 22, 1958, Serial No. 768,953

4 Claims. (Cl. 10—136)

This invention relates to machine tools, such as machines used for drilling, tapping, and like operations, and is concerned more particularly with a machine tool provided with a turret for holding a plurality of tools to be connected selectively to the driving spindle of the machine. The machine tool of the invention has a depth control mechanism of novel construction, which limits the distance through which the respective tools may be advanced, and may also operate to reverse the rotation of the tool at the completion of a tapping operation. The machine also includes a variable speed transmission and connections between the movable part of the turret and the depth control mechanism and the transmission, through which the movement of the movable part of the turret to bring a tool into effective position acts to make a corresponding part of the depth control mechanism operative and also adjusts the transmission to cause it to drive the main spindle and thereby the active tool at a speed appropriate for an operation by the tool.

For a better understanding of the invention, reference may be made to the accompanying drawings of a drilling machine embodying the invention. In the drawings, Fig. 1 is a view in side elevation, with parts broken away, of the essential features of the new drilling machine;

Fig. 8 is a view in side elevation, with parts broken away, of the hand wheel;

Fig. 9 is a sectional view on the line 9—9 of Fig. 2;

Fig. 10 is a view on an enlarged scale of a portion of Fig. 9 with the parts shown in different positions;

Figure 1:
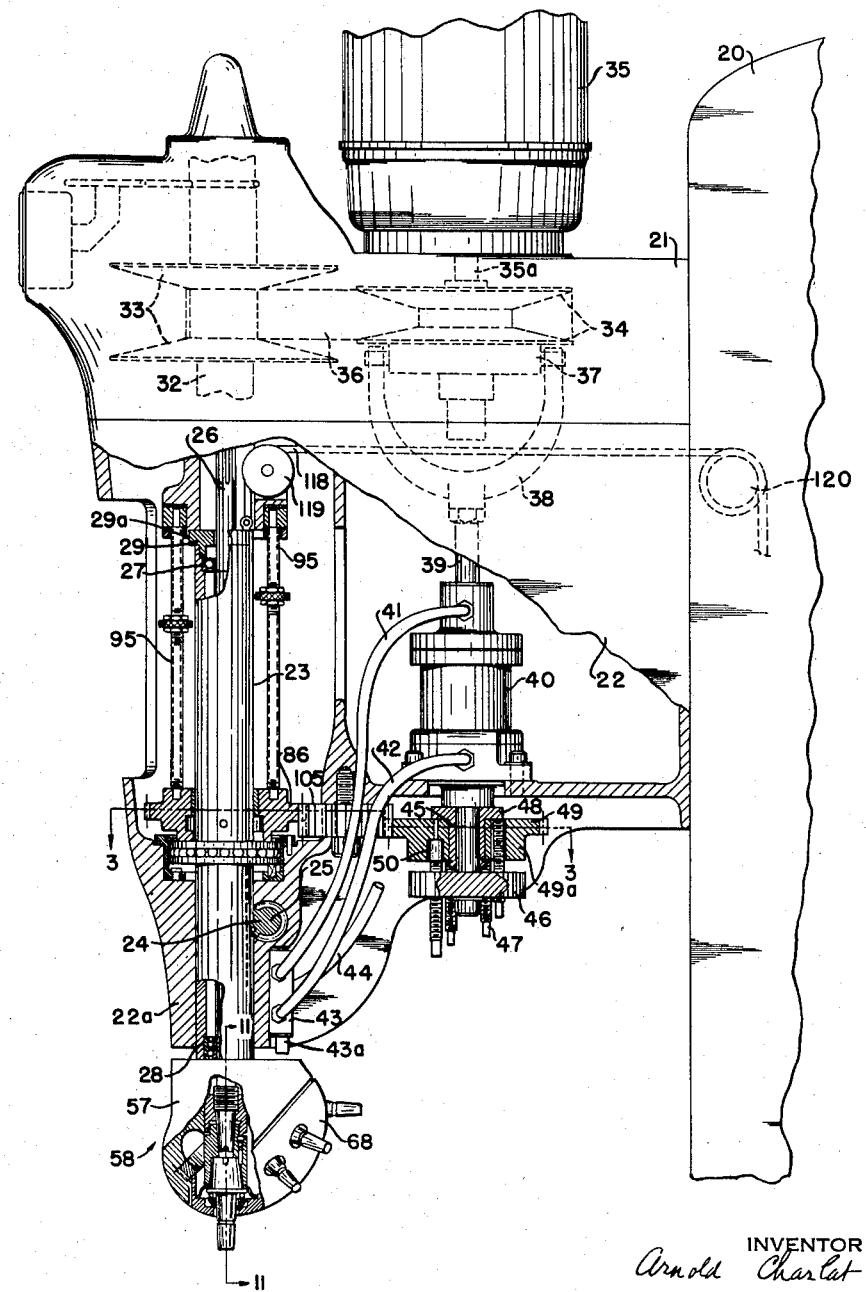

The drilling machine of the invention includes a column rising from a base and supporting a table and, since these parts are of conventional construction, only a portion of the column 20 is illustrated. An upper housing 21 and a lower housing 22 are secured to the vertical face of the column to overlie the table and the two housings normally lie in contact and are bolted together. A quill 23 is mounted for vertical movement in a downward extension 22a on the lower housing 22 and the quill may be moved vertically by means of rack teeth on the quill, which mesh with a pinion 24 on a shaft 25 mounted for rotation in bearings in the extension 22a.

Figure 2:
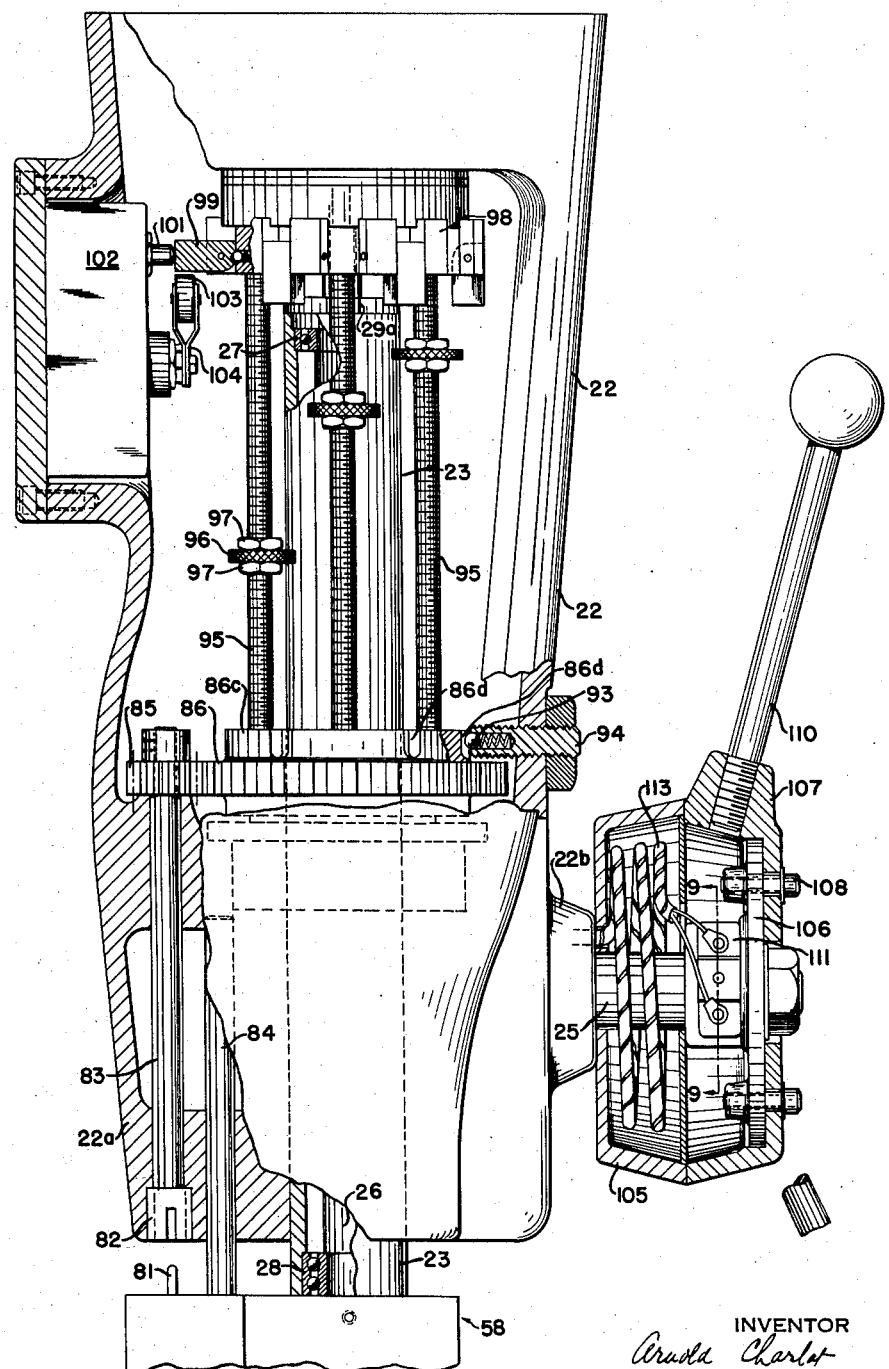
Fig. 2 is a fragmentary elevational view with parts broken away and at right angles to Fig. 1.
Figure 5:
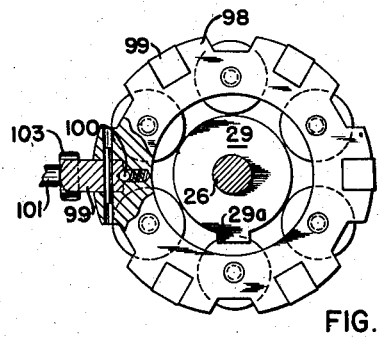
Fig. 5 is a top plan view with parts broken away of a part of the stop mechanism.

The main driving spindle 26 of the machine is mounted within the quill for rotation in upper and lower ball bearing 27, 28. The outer race of the upper bearing 27 (Fig. 2) is seated on a shoulder formed on the inner surface of the quill and the inner race of the bearing engages a circumferential shoulder on the spindle. The bearing is held in place by a bearing cap 29 having a tubular extension, which is secured in place within the upper end of the quill and engages the outer race of the bearing. The cap has a radial lug 29a (Fig. 5) forming the stop element of the depth control mechanism.

Figure 11:
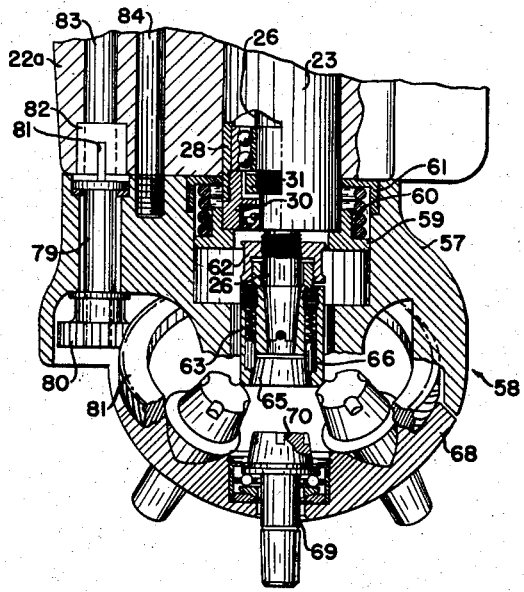
Fig. 11 is a sectional view on the line 11—11 of Fig. 1.

The lower bearing 28 (Fig. 11) has two rows of balls and its inner and outer races are seated at their upper ends against shoulders formed on the opposed surfaces of the quill and spindle, respectively. At its lower end, the outer race is seated upon the upper end of a bearing cap 30 threaded into the lower end of the quill, while the inner race is held in place by a lock nut 31 threaded upon the spindle 26.

Above the upper bearing cap 29 (Fig. 1), the spindle 26 is enclosed within a sleeve 32 secured to the spindle and supported for rotation in suitable bearings (not shown). The sleeve carries the driven discs 33 of a conventional infinitely variable speed transmission and is the output member of the transmission. The driving discs 34 of the transmission are mounted on the shaft 35a of a motor 35, which is mounted on the upper part 21 of the housing. The pairs of discs 33 and 34 are connected by a belt 36 and variations in the speed, at which sleeve 32 and spindle 26 are rotated by the motor, are effected by changing the spacing of the driving discs 34, the discs 33 then adjusting themselves accordingly. The means for changing the relative positions of discs 34 and thereby adjusting the transmission include a bearing supporting the lower disc 34 and mounted within a housing 37 loosely encircling shaft 35a and carried by the arms of a yoke 38 attached to a rod 39, which is secured to a piston within a cylinder 40 seated on part of housing 22. The piston is movable within the cylinder by air under pressure admitted into the cylinder above and below the piston through lines 41, 42, respectively. The lines lead from a valve 43, which is mounted on the downward extension 22a of the lower housing 22 and controls the connection of the lines to a supply line 44 leading from a source of air under pressure. Valve 43 is operable by a plunger 43a normally projecting downwardly from the lower end of the valve and, when the plunger is down, the valve connects the supply line 44 to the lower end of cylinder 40, so that the piston urges rod 39 upward to adjust the transmission for maximum speed.

A rod 45 attached to the piston in cylinder 40 projects downwardly below the lower end of the piston and carries a disc 46 (Fig. 4), in which are mounted a plurality of screws 47 acting as stops. The screws lie parallel to the rod 45 and are distributed about the rod and the screws may be adjusted to project upwardly beyond the disc 46 by different amounts. A bushing 48 surrounding rod 45 and secured to the lower end of cylinder 40 supports a gear 49 for rotation and the gear and its hub 49a are formed with openings parallel to the axis of rotation and one for each of the screws 47 in disc 46. The openings are so positioned that they may be aligned with respective screws and all but one of the openings extend entirely through the gear and hub, while the remaining opening extends from the lower face of the hub only partly through the gear and is closed by an abutment in the form of a plug 50.

Figure 4:
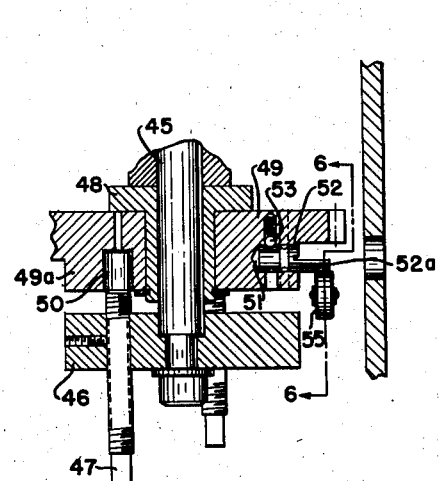
Fig. 4 is a sectional view on the line 4—4 of Fig. 3.

The hub 49a of gear 49 contains a plurality of radial bores 51 (Fig. 4), one for each of the screws 47, and the bores contain dogs 52, each of which has a cylindrical portion within its bore and a semi-cylindrical outer end 52a exposed beyond the bore. Each dog is rotatable in its bore to place its end 52a in upper or lower position and the dog may be held in one or the other of such positions of adjustment by a spring-pressed ball detent 53 mounted in the gear and entering one or the other of a pair of recesses in the surface of the dog. When the outer end 52a of a dog is in lower position, as shown in Fig. 4, rotation of gear 49 to a selected position causes the dog to engage and depress a roller 55 on a switch-operating arm 56 pivotally mounted on a wall of the lower housing 22. When the end 52a is in upper position, it can pass over roller 55 without causing arm 56 to be swung.

The quill 23 projects below the lower end of extension 22a (Fig. 11), and the projecting end of the quill enters a recess in the upper housing 57 of a turret generally designated 58. A bottom collar 59 within the recess in housing 57 is telescoped over the bearing cap 30 threaded into the lower end of the quill and the collar is secured to the cap by any suitable means. The collar is provided with a circumferential flange, upon which is seated a coil spring 60 encircling the quill and bearing at its upper end against the radial flange of an upper collar 61. Collar 61 lies within the upper end of the recess in housing 57 and is secured in place in any suitable way.

Figure 12:
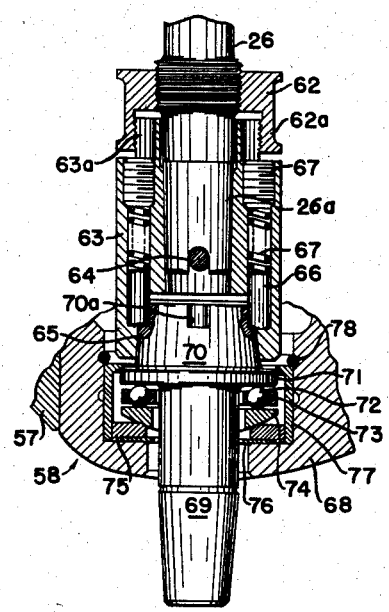
Fig. 12 is a view on an enlarged scale of a portion of Fig. 11 with the parts shown in different positions.

The spindle 26 projects below the lower end of the quill and has a collar 62 threaded thereon (Fig. 12). The collar has an axial flange 62a spaced from the spindle and internally threaded. The spindle projects downwardly below the collar and has a tapered end section 26a, at the lower end of which is a diametrical groove. A driver element 63 is mounted on the lower end of the spindle and has a neck 63a threaded into the flange 62a of collar 62 and a tapered internal bore, which receives the tapered end section 26a of the spindle. A pin 64 extends across the bore in the driver 63 in position to be received in the diametrical groove in the lower end of spindle 23. The lower end of the driver 63 has a tapered axial recess 65 and the driver is formed with one or more bores lying parallel to its axis and extending downward from its upper end to intersect the inner surface of recess 65. A pin 66 is seated in each bore and is forced downwardly by a spring 67 lying above the pin within the bore and held in place by a plug 67 threaded into the upper end of the bore. When the pin is seated against the lower end of its bore, a portion of the pin extends into the recess 65 through the tapered wall thereof.

The turret 58 is provided with a lower housing 68 pivotally mounted on the upper housing 57 for rotation on an axis at an angle to the axis of spindle 26. The lower housing is provided with a plurality of recesses arranged in a circular series concentric with the axis of rotation of the housing and a turret spindle 69 is mounted in each recess. Each spindle has a head 70, which projects into the interior of housing 68 beyond its recess and is formed with a taper, so that the head may enter the recess 65 at the lower end of the driver 63 with a driving fit. Each head 70 is also provided with recesses 70a in its tapered surface in position to receive pins 66 of the driver. Below its head 70, each turret spindle is formed with a radial flange 71, the under surface of which rests upon a group of balls 72 in a spacing ring 73. The balls run upon the flat upper surface of a bearing ring 74, which has a lower surface of spheroidal contour resting upon a similar surface on a bearing ring 75 seated in part upon the bottom of the recess in the housing 68 and in part upon a flat sealing ring 76 lying between the bearing ring 75 and the bottom of the recess. Ring 76 terminates close to the surface of the spindle 69, and the several parts of the bearing lie within a sleeve 77 seated upon the bottom of the recess and having an internal radial flange at its upper end overlying the flange 71. The sleeve is held in place by a snap ring 78 in an internal channel in the side wall of the recess.

The upper housing 57 of the turret is provided with a recess containing a vertical shaft 79 having a pinion 80 at its lower end, which meshes with teeth on a gear ring 81 attached to the top of the lower housing 68 of the turret. At its upper end, the shaft 79 is provided with a flat tang 81, which projects outwardly above the top of the upper housing 57. When the quill is raised, so that the top of housing 57 moves into contact with the lower end of the extension 22a of housing 22, the tang enters a socket in a member 82 mounted on the lower end of a shaft 83 supported for rotation in extension 22a. The upper housing 57 of the turret is kept from rotational movement by a rod 84 threaded into the housing and entering a bore in extension 22a.

Figure 3:
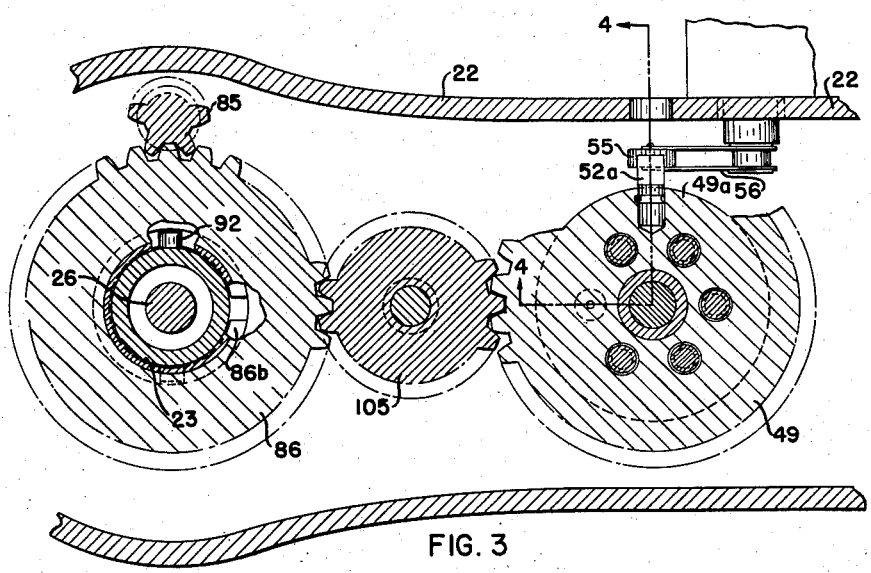
Fig. 3 is a sectional view on the line 3—3 of Fig. 1.

The shaft 83 carries a gear 85 at its upper end, which meshes with a gear 86 (Figs. 3, 7) encircling quill 23 and seated at its lower end on the upper ring of a ball thrust bearing 87. Bearing 87 lies within a housing 88 disposed within a recess in the upper end of housing extension 22a. The bottom of housing 88 is provided with pockets, in which are mounted a plurality of coil springs 89 engaging the lower race of bearing 87 and normally holding the bearing in an upper position in contact with the lower surface of a spring ring 90 seated in an internal groove in housing 88. The bottom of the housing is also provided with an opening containing the shaft of a stud 91, the head of which is engageable by the lower race of bearing 87 to limit the downward movement of the bearing in gear 86 against the resistance of springs 89.

Gear 86 has an internal cavity 86a, within which lies a radial pin 92 on the quill 23. The bottom of the cavity is defined by an internal flange 86b on the gear and the flange is formed with a plurality of slots, through which pin 92 may pass when the gear is in proper angular relation to the quill. Gear 86 also has a hub 86c having peripheral recesses 86d (Fig. 2), in which a spring-pressed ball detent 93 is receivable to hold the gear 86 in proper position. The ball is mounted in a recess in the end of a screw 94 threaded through an opening in the wall of housing 22.

The hub 86c of gear 86 is formed with a plurality of sockets in its upper face receiving the lower ends of threaded rods 95 arranged in a circular series. An abutment member in the form of a washer 96 is mounted on each rod and can be held at any desired position along the rod by upper and lower lock nuts 97. The washers are of such dimensions that they may be engaged by the lug 29a on the upper bearing cap 29. At their upper ends, the rods 95 are seated in sockets in a ring 98 (Fig. 5) encircling the spindle 26 and provided with radial sockets, one for each rod, in which are pivotally mounted dogs 99. Each dog is movable from a position, in which it lies parallel to spindle 26, to a position, in which it projects outwardly in a radial direction from ring 98 and a ball detent 100 for each dog serves to hold the dog in one or the other of the two positions. When a dog projects outwardly, it is in position to engage a plunger 101 (Fig. 2) for operating a switch within a switch box 102 mounted on the wall of housing 22. A dog 99 in radial position is also in position to engage the roller 103 on a switch-operating arm 104 pivotally mounted on the switch box 102.

The gear 86 (Fig. 3) meshes with an idler pinion 105, which is mounted on a stud on a wall of housing 22 and meshes with gear 49 previously described. When gear 86 is rotated by gear 85 as a result of the rotation of tang shaft 79 by rotation of the lower housing 68 of the turret, the gear 49 is rotated by a corresponding amount. The lower housing 68 can only be rotated when the quill has been raised to free the driver 63 from a turret spindle 69 and the upper turret housing 57 is in contact with the lower end of housing extension 22a and the tang 81 has entered member 82 on shaft 83. At this time, turret housing 57 has engaged valve plunger 43a and operated valve 43 to cause the piston in cylinder 40 to move the disc 46 downwardly to remove its screws 47 from the axial openings in the hub of gear 49.

The raising and lowering of the quill is effected by rotation of the shaft 25 formed with pinion teeth 24 meshing with rack teeth on the quill. The shaft projects out through a boss 22b on housing extension 22a and through a casing 105 mounted on the end of the boss. On the exposed end of the shaft is mounted a plate 106, which lies within a hub 107 secured to the plate for angular adjustment by bolts 108 mounted in openings in the plate and passing through curved slots 109 in the hub. The hub is provided with a plurality of spokes 110, by which the hub and shaft may be turned. A switch box 111 is mounted within hub 107 at one side of shaft 25 and the switch is operable by a plunger 112 and has terminals, from which lead conductors in a cable 113. The cable extends into casing 105, is wound a number of times around shaft 25 within the casing, and extends out of the casing and through an opening in boss 22b into housing 22a.

The operating plunger of switch 111 carries a piston 114 in a bore in a block 115, which loosely encircles shaft 25. A key 116 on the shaft enters an opening in the block, which extends transverse to the bore containing piston 114 and is slightly larger than the key. A spring 117 in the bore urges piston 114 into contact with key 116. With this arrangement, the counter-clockwise movement of shaft 25, as seen in Fig. 9, acts to lower the quill and causes key 116 to move in the opening in block 115 to the position shown in Fig. 10. In such movement, key 116 moves piston 114 and plunger 112 to open switch 111. When the key and plunger are in the positions shown in Fig. 10 and the shaft is moved clockwise, the initial movement of the shaft causes key 116 to move to the position shown in Fig. 9 and piston 114 is moved by spring 117 to close the switch.

The upward and downward movement of the quill is facilitated by counterweighting the moving parts and, for this purpose, a cable 118 is attached to an eye on the upper bearing cap 29 and is trained over a pulley 119 in housing 22 and a pulley 120 in the column 20. A counterweight of appropriate size is attached to the end of the cable below pulley 120 within the column.

Figure 13:
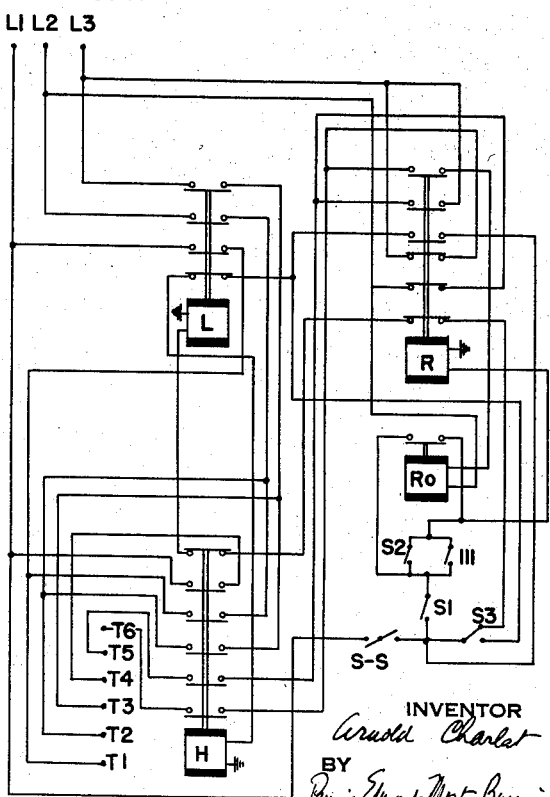
Fig. 13 is a simplified wiring diagram.

The wiring diagram (Fig. 13) shows circuits suitable for use when motor 35 is of the three phase type and has a low speed winding with terminals $T_1$, $T_2$, and $T_3$ and a high speed winding with terminals $T_4$, $T_5$, and $T_6$. The connection of the power lines $L_1$, $L_2$, and $L_3$ to the terminals of the low speed winding is controlled by a relay L having three pairs of normally open contacts with one contact of each pair connected to one of the power lines and the other to one of the terminals $T_1$, $T_2$, or $T_3$ of the motor. The relay L also has a pair of normally closed contacts in series with the winding of a relay H. The connection of the power lines to the terminals of the high speed winding of the motor is controlled by the relay H, which has three pairs of normally open contacts with one contact of each pair connected to one of the terminals $T_4$, $T_5$, or $T_6$. Relay H also has two other pairs of normally open contacts, which, upon closing, short-circuit the low speed winding of the motor, and a pair of normally closed contacts, which are in circuit with the winding of relay L.

The direction of rotation of the motor can be reversed by means of a relay R, which has two pairs of normally closed contacts in the connections between the lines $L_2$ and $L_3$ and terminals $T_5$ and $T_6$, respectively, and two pairs of normally open contacts, which, when closed, cause terminals $T_5$ and $T_6$ to be connected to lines $L_3$ and $L_2$, respectively, thus reversing the direction of rotation of the motor. Relay R also has a pair of normally open contacts in series with the winding of relay H and a pair of normally closed contacts in series with the winding of relay L. The winding of a relay $R_0$ is in one of the reversing connections for the motor and the relay has a pair of normally open contacts in series with the winding of relay R.

The motor of the machine is started and stopped by a switch S—S, and a switch $S_1$, which is closed when plunger 101 is engaged by a dog 99 (Fig. 2), controls the energization of relay R. The circuit to the relay winding includes switches $S_2$ and 111 and the contacts of relay $R_0$ all connected in parallel, so that, when switch $S_1$ is closed, relay R may be energized by closing either switch $S_2$ or switch 111, or by energization of relay $R_0$ with resultant closing of its contacts. Switch $S_2$ is operated by arm 104 carrying the roller 103 engaged by the dog 99, which has closed switch $S_1$, when the downward movement of the quill 23 has caused gear 86 to force ball bearing 87 against stop stud 91. Switch 111 is closed when hub 107 and shaft 25 are rotated clockwise by the spokes 110 to raise the quill.

The switch $S_3$ is employed to energize relays L or H and thus operate the motor in its low or high speed range. Switch $S_3$ is operated by arm 56 carrying roller 55, which is engageable with the end section 52a of one of the dogs 52 mounted in the hub of gear 49. If the dog is turned so as not to depress the switch arm 56, switch $S_3$ remains in the position shown in the wiring diagram and the relay L for low speed operation of the motor is energized upon closing of the switch S—S. If the dog depresses the switch arm, switch $S_3$ closes a circuit for energizing relay H upon the closing of switch S—S. The dogs 52 are the same in number and have the same arrangement in gear 49 as the tool spindles in the turret housing and, as the housing is moved to bring a particular tool into effective position, a corresponding dog moves into operative relation to the arm of switch $S_3$. The dogs are thus elements, which determine whether the motor will operate in its high speed or its low speed range during the use of a particular tool.

The specific speed, at which a given tool will be rotated in either the high or low speed range of the motor, is determined by the adjustment of the variable speed transmission and this is effected by raising or lowering the bottom driver disc 34 by means of the piston in cylinder 40. The limit, to which the piston can be raised, is determined by the engagement of one of the stop screws 47 with the abutment 50 mounted in the hub of gear 49. There are as many screws in the hub as there are tool spindles in the turret and an equal number of openings in gear 49. The arrangement of the screws and openings is such that, when the lower turret housing is rotated to bring a tool spindle into effective position, the gear 49 is correspondingly rotated to move the abutment, so that it overlies the screw corresponding to that tool spindle. Upward movement of the piston is thus limited by engagement of the screw with the abutment and the setting of the screw in disc 46 determines how high the piston may be moved and the corresponding setting of the transmission for a particular speed.

In order that the lower turret housing may be rotated to bring a selected tool into operative position, it is necessary that the driver 63 be moved clear of the tool spindle previously in place and also that the screws on disc 46 be moved clear of the openings in gear 49. As the quill is raised from operating position, its top engages plunger 43a of switch 43 and causes air to be fed into cylinder 40 above the piston to lower the latter. This lowers yoke 38 and results in the spreading of discs 34, so that the transmission will operate at the lowest speed. The lowering of the piston also moves disc 46 to remove the stop screws 47 from the openings in gear 49. During the upward movement of the quill, the tang 81 on shaft 79 enters member 82 on shaft 83 and, after the top of the turret has engaged the lower end of housing extension 22a, the quill can be moved upward farther to free member 63 from the tool spindle, with which it was formerly engaged. The final increment of upward movement of the quill is resisted by spring 60 bearing against the lower collar 59 attached to the quill.

Figure 7:
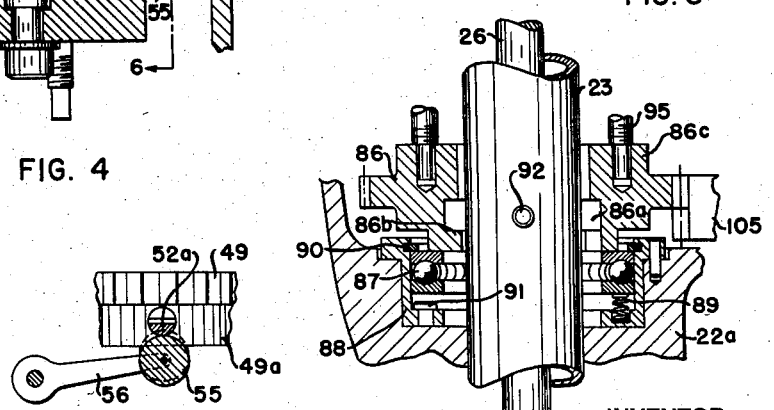
Fig. 7 is a view, partly in vertical section and partly in elevation, showing the lower end of the depth control mechanism.
Figure 6:
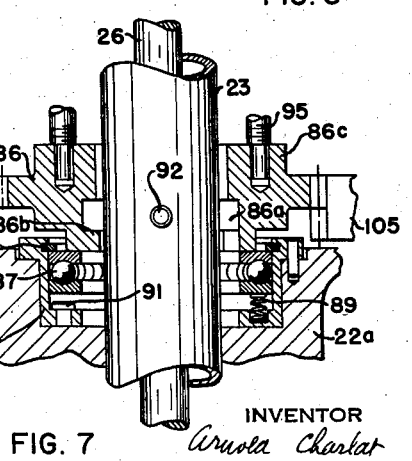
Fig. 6 is a fragmentary sectional view on the line 6—6 of Fig. 4.

When the machine is used in tapping, the direction of rotation of the main drive spindle 26 must be reversed to withdraw the tap from the work and it is desirable that, when movement of the tap into the work has been stopped by engagement of the stop element 29a with an abutment member 96, the direction of rotation of the main drive spindle 26 be automatically reversed at the same time. It is also desirable that the operator be able to reverse the direction of rotation of the main drive spindle 26 at any point in the tapping operation to ease the load on the tap. These results are obtained in the new machine by the use of the relay R and the switches $S_1$, $S_2$, and 111. The switch $S_1$ is closed by engagement of its plunger 101 by a dog 99 on ring 98 and, when a particular tool spindle is to carry a tap, the corresponding dog 99 on ring 98 is moved to the position, in which it projects radially from the ring. When the turret is adjusted to bring the tool spindle carrying the tap into effective position relative to the spindle 26, the ring 98 is correspondingly turned and the dog 99 corresponding to the tool spindle strikes plunger 101 and closes switch $S_1$. At that time, the dog 99 also lies above roller 103 on arm 104 operating switch $S_2$. When the tapping proceeds until the stop element 29a on the quill strikes the abutment member 96 in effective position, a slight farther downward movement of the quill is possible against the resistance of springs 89 until the lower race of ball bearing 87 has struck the stop stud 91 (Fig. 7). In this final downward movement of the cage, dog 99 swings arm 104 to close switch $S_2$ and this results in energization of relay R and the reversal of the motor. As soon as the motor reverses and begins to turn the tap out of the work, the tool spindle carrying the tap and the turret move up. This causes a clockwise movement of shaft 25 as seen in Fig. 10 and key 116 on the shaft tends to move away from plunger 114, so that switch 111 is closed. As soon as the quill has moved upward, so that the stop element 29a has released the pressure on its abutment member 96, springs 89 move the cage upward, so that dog 99 frees arm 104 and the arm rises to open switch $S_2$. However, switch 111 continues closed and the motor continues in reverse until the operator turns the handle and shaft 25 counter-clockwise and thus causes key 116 to push on plunger 114 and open switch 111. The circuits are so arranged that, during its reversal, the motor operates in its high speed range.

Upon the energization of relay R and the reversal of the motor, a surge of current momentarily energizing relay $R_0$ will cause that relay to maintain its contacts closed for a predetermined interval, such as two seconds. During this period, it is not possible for the operator to move the handle to open switch 111 and thereby deenergize relay R and cause the motor to start to turn in its original direction. Relay $R_0$ thus introduces a protective time lag in the reversing of the motor.

The driving connection between the main driving spindle 26 and any tool spindle and comprising the female driver element 63 and the male end section on the tool spindle automatically becomes positive, in the event that there is any slippage between the driver and driven elements. When the quill has been raised and the parts are in the positions illustrated in Fig. 11, the driver element 63 is free of the tool spindle aligned with it and the lower turret housing can, accordingly, be rotated to bring another tool spindle into effective position. When the quill is again lowered, the driver element 63 telescopes over the end section of the tool spindle in effective position and the two spindles become automatically aligned by reason of the mounting of the tool spindle on the ball bearing having the spheroidal surface on its lower race. As the driver and driven elements fit together, the pins 66 on the driver are forced upwardly into their bores unless the pins happen to enter the bores 70a in the driven element. The fit between the driver and driven element is sufficiently tight for most purposes, even though the pins are not functioning. However, if there is any slippage of the driven element relative to the driver, the pins will move into alignment with the bores 70a and will at once enter the bores and effect a positive connection between the elements.

While the driver element has been shown as female in form and the end sections on the tool spindles as male, it will be evident that the opposite arrangement could be used, if desired. However, it is more difficult to make a female element with the desired accuracy and, therefore, it is desirable to utilize such an element as the driver, since only one is required.

This application is a division of my co-pending application Ser. No. 417,103, filed March 18, 1954.

I claim:

1. A machine tool, which comprises the combination of a quill mounted for axial movement, a driving spindle mounted in the quill for movement therewith and rotary movement relative thereto, a driving member mounted on the driving spindle at one end beyond the quill, means for rotating the driving spindle, a turret mounted on the quill adjacent the driving member and having a rotary support and tool spindles mounted for rotation on the support, each tool spindle having a driven member adapted to be engaged with the driving member to connect the tool spindle to the driving spindle, the rotary movement of the support placing the tool spindles successively in effective position for connection to the driving spindle, a stop element on the quill, a rotary mounting coaxial with the quill and having a limited movement lengthwise of the quill, means arresting the mounting at opposite ends of its movement, a spring resisting the movement of the mounting in one direction, abutment members carried by the mounting and corresponding to respective tool spindles, the abutment members being engageable alternatively by the stop element to cause movement of the mounting in said direction with the quill, means operable to reverse the action of the spindle rotating means, a plurality of actuating members carried by the mounting and corresponding to respective tool spindles, the members being movable alternatively into effective relation to the reversing means and adjustable to make them effective to actuate the reversing means upon movement of the mounting against the action of the spring, and means operated by the support in its rotation to rotate the mounting to bring into opposition to the stop element the abutment member corresponding to the tool spindle moved into effective position and to move into effective relation to the reversing means, the actuating member corresponding to the effective spindle.

2. The machine tool of claim 1, in which the means for rotating the spindle includes a reversible motor.

3. The machine tool of claim 1, in which the mounting is a rotary cage mounted coaxially with the quill and including spaced heads and longitudinal bars connecting the heads and lying parallel to the common axis of the quill and cage, the bars corresponding in number and arrangement to the tool spindles, and the abutment members are mounted adjustably on respective bars between the ends thereof.

4. A machine tool which comprises the combination of a quill mounted for axial movement, a driving spindle mounted in the quill for movement therewith and rotary movement relative thereto, a driving member mounted on the driving spindle at one end beyond the quill, means for rotating the driving spindle, a turret mounted on the quill adjacent the driving member and having a rotary support and tool spindles mounted for rotation on the support, each tool spindle having a driven member adapted to be engaged with the driving member to connect the tool spindle to the driving spindle, the rotary movement of the support placing the tool spindles successively in effective position for connection to the driving spindle, a stop element on the quill, a rotary cage mounted coaxially with the quill and including spaced heads and longitudinal bars connecting the heads and lying parallel to the common axis of the quill and cage, the bars corresponding in number and arrangement to the tool spindles, abutment members adjustably mounted on respective bars between the ends thereof and engageable alternatively by the stop element to limit the axial movement of the quill in one direction, and means operated by the support in its rotation to rotate the cage to bring into opposition to the stop element the abutment member corresponding to the tool spindle moved into effective position.

References Cited in the file of this patent

UNITED STATES PATENTS

| | | |
|---|---|---|
| 590,387 | Childs | Sept. 21, 1897 |
| 2,767,598 | Burg | Oct. 23, 1956 |